No. 729,693. PATENTED JUNE 2, 1903.
A. STEINKOENIG.
FILTER.
APPLICATION FILED SEPT. 22, 1902.
NO MODEL.

Witnesses
C. W. Miles
A. McCormack

Inventor
Adam Steinkoenig
By Murray & Murray
Attorneys

No. 729,693. Patented June 2, 1903.

UNITED STATES PATENT OFFICE.

ADAM STEINKOENIG, OF CINCINNATI, OHIO.

FILTER.

SPECIFICATION forming part of Letters Patent No. 729,693, dated June 2, 1903.

Application filed September 22, 1902. Serial No. 124,293. (No model.)

*To all whom it may concern:*

Be it known that I, ADAM STEINKOENIG, a citizen of the United States of America, and a resident of Cincinnati, county of Hamilton, State of Ohio, have invented certain new and useful Improvements in Filters, of which the following is a specification.

The object of my invention is a filter of the class that utilizes pulp or similar material as a filtering medium, in which the liquid after having passed through the medium collects quickly and passes freely from the filtering-chamber into the reservoir, and in which the entrance of the liquid into the filter is regulated so as not to displace the filtering medium. This object is attained by the means described in the specification and illustrated in the accompanying drawings, in which—

Figure 1:
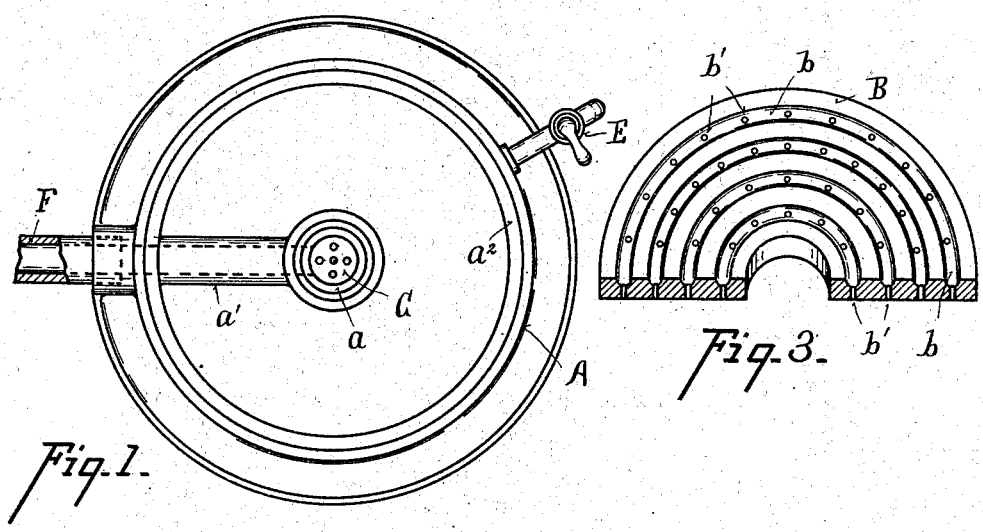
Figure 3:
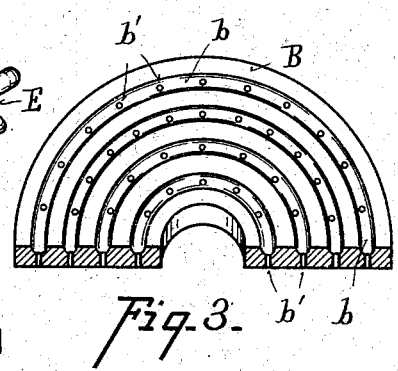
Figure 2:
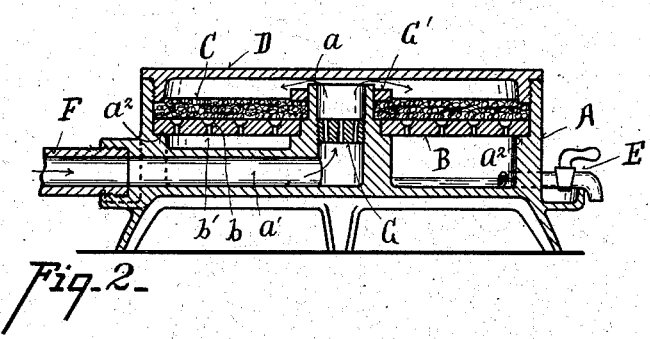

Figure 1 is a plan view of the main vessel of the filter embodying my invention, the filtering medium, the plate for supporting the same, and the cover of the filter being removed. Fig. 2 is a central longitudinal sectional view of the filter embodying my invention complete. Fig. 3 is a perspective view of one-half of the plate which supports the filtering medium.

Referring to the parts, the main vessel A consists of a shallow circular dish having a central hub $a$ of a height slightly less than the height of the vertical wall of the vessel. Leading into hub $a$ is a channel $a'$, which is upon the bottom of vessel A and extends to the outside of the vessel, where it has a boss interiorly screw-threaded to receive pipe F, through which the murky liquid is admitted under pressure to the vessel. Vessel A has an interior collar $a^2$, upon which rests supporting-plate B, upon which the filtering medium C is placed. Plate B has a series of concentric grooves $b$. Each of grooves $b$ has in its bottom a series of perforations $b'$, passing through plate B. The pulp C is kept from being displaced by the inflowing liquid by means of a perforated plug G, which is screw-threaded to fit the interior of hub $a$ and is placed within the hub at a distance below its upper edge, and by a flat ring G', which lies upon the pulp surrounding the hub $a$. Vessel A is closed by a cover D, screw-threaded to engage interior screw-threads upon the upper edge of the vessel.

In operation the liquid to be filtered—as, for instance, whisky—is admitted through pipe F under pressure and passes in through channel $a'$ up through hub $a$. The plug G allows the liquid to flow in only at a certain rate, so that it does not wash the pulp out of place. After passing through plug G the liquid passes in upon top of the filtering medium, the ring G' preventing it from washing the pulp from around the hub. While plug G regulates the rapidity of the inflowing liquid, it does not diminish the pressure upon the liquid in vessel A. The pressure causes the liquid to be forced down through the pulp C. The grooves $b$ collect the liquid after it has passed through the filtering medium, and from the grooves $b$ it passes quickly through perforations $b'$ into the reservoir in the bottom of vessel A, from whence it may be drawn by means of a faucet E.

What I claim is—

1. In a filter, the combination of a main vessel, having an inlet-pipe extending up from its bottom, a perforated plate dividing the vessel into a filtering-chamber and a reservoir, a filtering medium of the character described upon the plate, a perforated plug in the inlet-pipe for regulating the rate of influx substantially as shown and described.

2. In a filter, the combination of a main vessel having a central hollow hub, a perforated plate dividing the vessel into a filtering-chamber and a reservoir, a filtering medium upon the plate, a perforated plug within the hub and a ring surrounding the hub and resting upon the filtering medium substantially as shown and described.

ADAM STEINKOENIG.

Witnesses:
W. F. MURRAY,
A. McCORMACK.